US012669187B2

(12) United States Patent
Dehrmann et al.

(10) Patent No.: US 12,669,187 B2
(45) Date of Patent: Jun. 30, 2026

(54) VALVE BODY FOR A VALVE OF A COOLANT SYSTEM, VALVE HAVING SUCH A VALVE BODY, AND MANUFACTURING METHOD

(71) Applicant: ECO Holding 1 GmbH, Marktheidenfeld (DE)

(72) Inventors: Sven Dehrmann, Worth (DE); Daniel Viertler, Bad Urach (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 10 days.

(21) Appl. No.: 18/790,761

(22) Filed: Jul. 31, 2024

(65) Prior Publication Data
US 2025/0043873 A1 Feb. 6, 2025

(30) Foreign Application Priority Data
Aug. 4, 2023 (DE) ..................... 10 2023 120 797.0

(51) Int. Cl.
| | |
|---|---|
| *F16K 11/087* | (2006.01) |
| *F01P 7/14* | (2006.01) |
| *F16K 5/06* | (2006.01) |
| *F16K 27/06* | (2006.01) |
| *F16K 31/04* | (2006.01) |

(52) U.S. Cl.
CPC ........ *F16K 11/0873* (2013.01); *F16K 5/0605* (2013.01); *F01P 2007/146* (2013.01); *F16K 27/067* (2013.01); *F16K 31/041* (2013.01)

(58) Field of Classification Search
CPC .. F16K 11/0873; F16K 27/067; F16K 5/0605; F16K 31/041; F01P 2007/146; F01P 7/14

USPC ...................................................... 251/315.16
See application file for complete search history.

(56) References Cited

U.S. PATENT DOCUMENTS

| | | | | | |
|---|---|---|---|---|---|
| 3,038,489 | A | * | 6/1962 | Allen .................... | F16K 5/0636 |
| | | | | | 251/315.08 |
| 4,103,868 | A | * | 8/1978 | Thompson ............ | F16K 5/0605 |
| | | | | | 251/315.08 |
| 4,214,732 | A | * | 7/1980 | Kindersley ........... | F16K 5/0642 |
| | | | | | 251/315.16 |
| 4,542,878 | A | * | 9/1985 | Kulisek ................. | F16K 5/0605 |
| | | | | | 251/315.16 |
| 5,979,873 | A | * | 11/1999 | Wu ....................... | F16K 5/0605 |
| | | | | | 29/890.132 |

(Continued)

FOREIGN PATENT DOCUMENTS

| | | | | | |
|---|---|---|---|---|---|
| CN | 111350844 | A | * | 6/2020 | ........... F16K 31/535 |
| DE | 102020207303 | A1 | * | 12/2020 | .............. F01P 7/165 |

*Primary Examiner* — David Colon-Morales
(74) *Attorney, Agent, or Firm* — Lerner David LLP

(57) ABSTRACT

A valve body for a valve of a coolant system: includes at least one tubular through channel for a coolant and a base body which is designed to be rotatable about an axis of rotation by a drive and has a contact surface for abutting against a sealing arrangement of a valve housing of the valve with at least two sealing portions and at least two sliding portions which lie on a spherical enveloping surface. The base body is divided by an equatorial plane arranged orthogonally to the axis of rotation. The base body includes an opening which is arranged parallel to the equatorial plane and is closed by a cover. The through channel is formed by the base body and the cover.

14 Claims, 2 Drawing Sheets

(56)  References Cited

U.S. PATENT DOCUMENTS

| | | | | |
|---|---|---|---|---|
| 6,471,183 | B2 * | 10/2002 | Roszkowski | F16K 5/0605 |
| | | | | 251/315.01 |
| 7,516,941 | B2 * | 4/2009 | Combs | F16K 5/0647 |
| | | | | 251/315.01 |
| 8,262,061 | B2 * | 9/2012 | King | F16K 5/0647 |
| | | | | 251/192 |
| 8,960,643 | B2 * | 2/2015 | Vincent | B23C 3/04 |
| | | | | 251/315.16 |
| 9,581,253 | B2 * | 2/2017 | Scaramucci | F16K 5/0605 |
| 9,644,752 | B2 * | 5/2017 | Nabors | F16K 27/062 |
| 9,695,734 | B2 * | 7/2017 | Carns | F16K 5/0605 |
| 10,295,076 | B2 * | 5/2019 | Russalian | F01P 7/16 |
| 10,337,395 | B2 * | 7/2019 | Crusius | F16K 11/076 |
| 10,344,883 | B2 * | 7/2019 | Brazas | F16K 11/0876 |
| 10,808,863 | B2 * | 10/2020 | Bugeja | F16K 11/165 |
| 10,928,077 | B2 * | 2/2021 | Arrus | F24D 19/1024 |
| 11,143,316 | B2 * | 10/2021 | Park | F16K 5/0407 |
| 11,149,862 | B2 * | 10/2021 | Kanzaki | F16K 11/0876 |
| 11,255,444 | B2 * | 2/2022 | Seeger | F16K 11/0853 |
| 11,339,879 | B2 * | 5/2022 | Yan | F16K 11/0873 |
| 12,404,945 | B2 * | 9/2025 | Fleischmann | G05D 7/0623 |
| 2008/0105845 | A1 * | 5/2008 | Yeary | F16K 5/0605 |
| | | | | 251/315.01 |
| 2015/0308576 | A1 * | 10/2015 | Yelkin | B29C 45/261 |
| | | | | 251/315.16 |
| 2018/0209549 | A1 * | 7/2018 | Yelken | B29C 45/73 |

* cited by examiner

VALVE BODY FOR A VALVE OF A COOLANT SYSTEM, VALVE HAVING SUCH A VALVE BODY, AND MANUFACTURING METHOD

TECHNICAL FIELD

The invention relates to a valve body for a valve of a coolant system according to the preamble of claim 1. Furthermore, the invention relates to a valve having such a valve body, and a manufacturing method.

PRIOR ART

A valve body of the type mentioned in the beginning is known, for example, from DE 10 2020 207 303 A1. Such a valve body is usually used as an actuating element in a valve in order to direct coolant flows into different paths. For this purpose, the valve body has a base body which is rotatable about an axis of rotation by means of a drive. The outer surface or outer contour of the valve body follows spherical enveloping surface at least in portions, so that sealing arrangements between the valve body and a valve housing can seal well against the valve body. The valve body furthermore comprises at least one through channel which has at least one opening which is located at the level of an equatorial plane of the base body.

Such valve bodies are usually produced by injection molding processes. In order to shape the through channel, a sliding element is introduced into the injection mold during the injection molding, which sliding element is first injection-molded. Thereby, the sliding element shapes the through channel. Prior to the thus injection-molded valve body being removed from the injection mold, the sliding element is removed, so that the through channel is exposed. In order to be able to easily remove the sliding element, it is essential that the sliding element does not have a continuous cross-sectional diameter, but tapers towards its tip. Thus, the sliding element essentially has a draft angle, so that it can be easily removed from the cooling injection molded part. However, this production-related requirement has disadvantages for the function of the valve body. Due to the fact that the through channel does not have a uniform cross-sectional diameter, a pressure gradient arises when coolant flows through it, which pressure gradient can lead to undesired turbulences or pressure peaks in the entire coolant system. In particular during the switching of the valve, these pressure changes can have an effect in different regions of the coolant system. As a result, this at least leads to an energy loss which, for example, has to be compensated by an increased power of a coolant pump, which in turn reduces the efficiency of the coolant system.

SUMMARY OF THE INVENTION

An object of the invention is therefore to specify a valve body for a valve of a coolant system, which valve body can be easily adapted to the respective intended use in a coolant system within the scope of production, in particular effecting an improved coolant flow. Furthermore, it is an object of the invention to specify a valve having such a valve body, and a manufacturing method.

Thus, the invention is specifically based on the idea of specifying a valve body for a valve of a coolant system, wherein the valve body comprises the following:
at least one tubular through channel for a coolant and a base body which is designed to be rotatable about an axis of rotation by means of a drive and has a contact surface for abutting against a sealing arrangement of a valve housing of the valve with at least two sealing portions and at least two sliding portions which lie on a spherical enveloping surface.

In this case, the base body is divided by an equatorial plane arranged orthogonally to the axis of rotation. According to the invention, it is provided that the base body comprises an opening which is arranged parallel to the equatorial plane and is closed by a cover, wherein the through channel is formed by the base body and the cover.

The base body, the contact surface of which has at least two sealing portions and at least two sliding portions on a spherical enveloping surface, permits good sealing with respect to a valve housing and also effects an easy switching of the valve position. In particular, the sealing portions which lie on the spherical enveloping surface ensure that there is a permanently good seal between the base body and a valve housing. A loss of coolant is thus avoided. By contrast, the sliding portions ensure that the contact surface can slide well over sealing arrangements of a valve housing during the switching of the valve, i.e. during a rotation of the valve body.

The creation of the valve body from a base body and a cover, i.e. a two-part configuration of the valve body, has a plurality of advantages. A significant advantage is that, as a result of the separate creation of a base body during manufacturing in an injection-moulding process, there are higher degrees of freedom for the inner geometry of the base body. In particular, sliding elements which are equipped without a draft angle can be used for the creation of the through channel. With the two-part configuration of the valve body, it is thus made possible in the manufacturing process to create a through channel with a uniform cross-sectional diameter. Alternatively, a through channel with different cross-sectional diameters can also be created. For example, this can be configured in a targeted manner in order to achieve a flow acceleration of the coolant or to achieve a pressure reduction. The two-part configuration of the valve body allows these options and thus increases the flexibility in the manufacturing process in order to produce different valve bodies for different applications of valves of a coolant system.

In a preferred embodiment, however, the valve body is configured such that the through channel has a uniform cross-sectional diameter. Pressure gradients that occur in the case of integrally injection-molded valve bodies are thus avoided. Rather, a uniform, in particular laminar, coolant flow can thus be achieved.

In a further preferred variant of the valve body according to the invention, it can be provided that the sliding portions have a height which is smaller than the diameter of the sealing portions, with the result that the coolant can flow over the base body during a switching operation of the valve. In other words, the contact surface of the base body is preferably not arranged over the entire circumference on the spherical enveloping surface, but rather is interrupted in regions or does not extend along the spherical enveloping surface in regions, but rather merely within the spherical volume delimited by the spherical enveloping surface. This applies in particular in the region of the sliding portions, the height of which is smaller than the diameter of the sealing portions. Here, the sealing portions extend in a circular manner around the access opening and include the diameter.

In the region of the sliding portions, a targeted and desired leakage is thus created so that coolant can flow over the base body.

In the case of valve bodies which substantially include a contact surface which does not permit an overflow during the switching, a coolant flow is at least briefly completely interrupted during the switching of the valve. This leads to a build-up of coolant on the sliding portion, which results in a high local pressure. As soon as the valve body has been rotated to such an extent that the next through channel is opened, this local pressure is abruptly reduced, which can lead to strong pressure fluctuations in the entire coolant system. Such strong pressure fluctuations are often undesired.

Since, in the preferred exemplary embodiment of the invention, it is provided that the sliding portions are configured to be lower than the sealing portions, a portion of the coolant can flow over the valve body during the switching of the valve. A build-up of the coolant on the sliding portions is thus avoided. Thus, pressure peaks which arise in the case of conventional valve bodies during the switching operation are strongly damped. This promotes a uniform coolant flow in the entire coolant system.

The cover which closes the opening of the base body can be connected to the base body in an integrally bonded and/or form-fitting manner, in particular by welding or clipping. The cover substantially serves to complete the valve body. In order for the valve body to be otherwise largely sealed, it is advantageous to connect the cover to the base body in an integrally bonded manner, in particular by welding. Suitable welding methods are hot-gas welding, ultrasonic welding or laser welding. One particularly simple manufacturing option is to connect the cover to the base body in a form-fitting manner, for example by clipping. This simplifies the manufacturing process and is efficient in particular at high batch rates. The form-fitting connection can also be used in order to position the cover first, wherein a firm and sealed connection is subsequently produced by fixing the cover to the base body in an integrally bonded manner. In this respect, the cover can, for example, be connected first to the opening by clipping and then fixed and sealed by a welding process.

In a preferred embodiment of the valve body according to the invention, the base body has a partition wall which extends along the axis of rotation of the drive shaft and divides the rotor into two valve halves, wherein a through channel is formed in each valve half. Overall, the valve body thus has two through channels, as a result of which the possible use cases of the valve body are increased. In particular, valves can thus be created which connect or separate a plurality of coolant circuits.

It is preferred if the cover has a flow-guiding contour with two parallel legs. The flow-guiding contour is preferably adapted such that it directs the flow within the respective through channel. In this case, the flow-guiding contour is preferably configured such that a substantially uniform flow through the through channel is achieved. A gap for receiving the partition wall can extend between the two parallel legs of the flow-guiding contour. When the cover is inserted into the opening of the base body, the cover can thus be aligned exactly by the gap which receives the partition wall of the base body. It is thus ensured that the through channels which are formed jointly by the base body and the cover assume a correct alignment. The gap between the parallel legs of the flow-guiding contour thus forms a form-fitting connection between the cover and the base body which simultaneously ensures a correct positioning of the cover.

The flow-guiding contour of the cover, in particular each leg, can have a curved inner surface which merges flush into a curved inner surface of a flow-guiding contour of the base body and delimits the through channel. The curved inner surface is preferably formed as a section of a pipe outer surface. This preferably applies both to the inner surface of the leg and to the inner surface of the flow-guiding contour of the base body. The inner surfaces of the flow-guiding contour of the cover and of the flow-guiding contour of the base body thus each form the curved inner surface of the tubular through channel. In this way, the through channel is delimited both by the base body and by the cover and has a substantially circular cross section. In particular, it is provided that the cross-sectional diameter of the through channel is uniform over its entire length.

A further embodiment of the valve body according to the invention provides that the sliding portions of the contact surface are each subdivided by a separating ridge which extends parallel to the axis of rotation.

In previous, integrally injection-molded valve bodies, there is an issue in that a separating ridge usually forms along the equatorial plane. The separating ridge forms an unevenness in the contact surface to a sealing arrangement of a valve housing. This leads to the fact that the sealing between the sealing portions and the sealing arrangement cannot be completely ensured because the separating ridge permits coolant to escape. During the switching of such a known valve, there is furthermore the risk that the seal is damaged by the separating ridge which slides over the sealing arrangement during the switching and a leakage can thus also occur permanently.

The embodiment according to the invention avoids this by the separating ridge extending parallel to the axis of rotation and being arranged in the sliding portion. The sealing portions are thus free of any separating ridge which ensures a good and permanent sealing. In the region of the sealing portions, the contact surface can thus be of very smooth design, as a result of which good abutting against the sealing arrangement of a valve housing results. This ensures a permanently good sealing.

It is furthermore preferred if the separating ridge is arranged so as to be completely countersunk in a groove. In other words, it is provided that the separating ridge does not protrude beyond the contact surface. It is thus ensured that the separating ridge does not damage the sealing arrangement during the switching of the valve, i.e. during the sliding of the sliding portion over a sealing arrangement. The relatively rough separating ridge is rather countersunk in the groove and thus substantially does not come into frictional contact with the sealing arrangement. A good sealing is thus also ensured after a multiplicity of switching operations.

The sealing portion preferably extends in a circular manner around the access opening. In the case of a circular sealing portion which simultaneously lies on a spherical enveloping surface, a substantially planar sealing surface is achieved, which is a prerequisite for a permanently good sealing. In particular, it is thus avoided that the sealing arrangement has to be configured specifically in a three-dimensional manner in order to achieve a good sealing effect. A relatively simple sealing arrangement, for example a sealing ring, is therefore sufficient to seal well against the sealing portion.

An independent aspect of the invention relates to a valve with a valve housing which has at least two, in particular four, connection channels. The valve furthermore comprises an above-described valve body which is arranged rotatably in the valve housing and can be positioned such that its through channel connects two connection channels.

The advantages and preferred improvements mentioned in connection with the above-described valve body also apply correspondingly to the disclosed valve. In particular, the valve forms a switching valve such that two separate coolant circuits can be connected to one another or can be separated from one another.

In a preferred embodiment of the valve, a sealing arrangement is assigned to each connection channel, which sealing arrangement seals against the valve body, in particular the sealing portions of the contact surface. The sealing arrangement can be formed from one or more sealing elements. If a plurality of sealing elements are provided, it is advantageous if a separate function is assigned to each sealing element. For example, one sealing element can ensure a radial seal and a further sealing element can ensure an axial seal. The sealing elements of a sealing arrangement are preferably connected to one another in a captive manner.

Within the scope of the present application, a method for manufacturing an above-described valve body is furthermore disclosed and claimed, in which the base body and the cover are each shaped by an injection-moulding process and are subsequently connected to one another. The method allows greater design versatility and design freedom through the two-piece or separate design of the body and cover, especially with regard to the geometry of the at least one through-channel formed in the valve body.

The connection of the cover to the base body can advantageously be made by welding, in particular hot-gas welding, ultrasonic welding or laser welding. Alternatively or additionally, the cover can be connected to the base body by clipping. It is also conceivable that the cover is initially connected to the base body in a form-fitting manner and positioned by clipping or a snap connection, wherein a final fixing of the cover to the base body is achieved by a subsequent welding method.

In a particularly preferred improvement of the method according to the invention, during the injection molding of the base body, at least two sliding elements are introduced, in particular radially, into the injection mold and removed after the cooling of the base body, wherein the sliding elements form the flow-guiding contour of the base body including the access openings. Thereby, each sliding element can have a uniform cross-sectional diameter. In particular, no draft angle is required. By the sliding elements being introduced, in particular radially, into the base body, the through channel can be easily formed and the injection molded part can subsequently be easily demolded by the sliding elements being removed again. It is preferred if the sliding elements are introduced radially, i.e. via the contact surface at the level of the equatorial plane, into the injection mold. The sliding elements are injection-molded during the injection molding process and keep the space that later forms the flow channel free of injection molded material. Prior to the shaping of the base body from the injection mold, the sliding elements are removed.

BRIEF DESCRIPTION OF THE DRAWINGS

The above-described, different and exemplary features can be combined with one another according to the invention, insofar as this is technically meaningful and suitable.

Further features, advantages and embodiments of the invention result from the following description of the exemplary embodiments illustrated in the figures. In the figures.

In principle, the same parts are provided with the same reference numerals in the figures.

WAYS OF CARRYING OUT THE INVENTION

Figure 1:
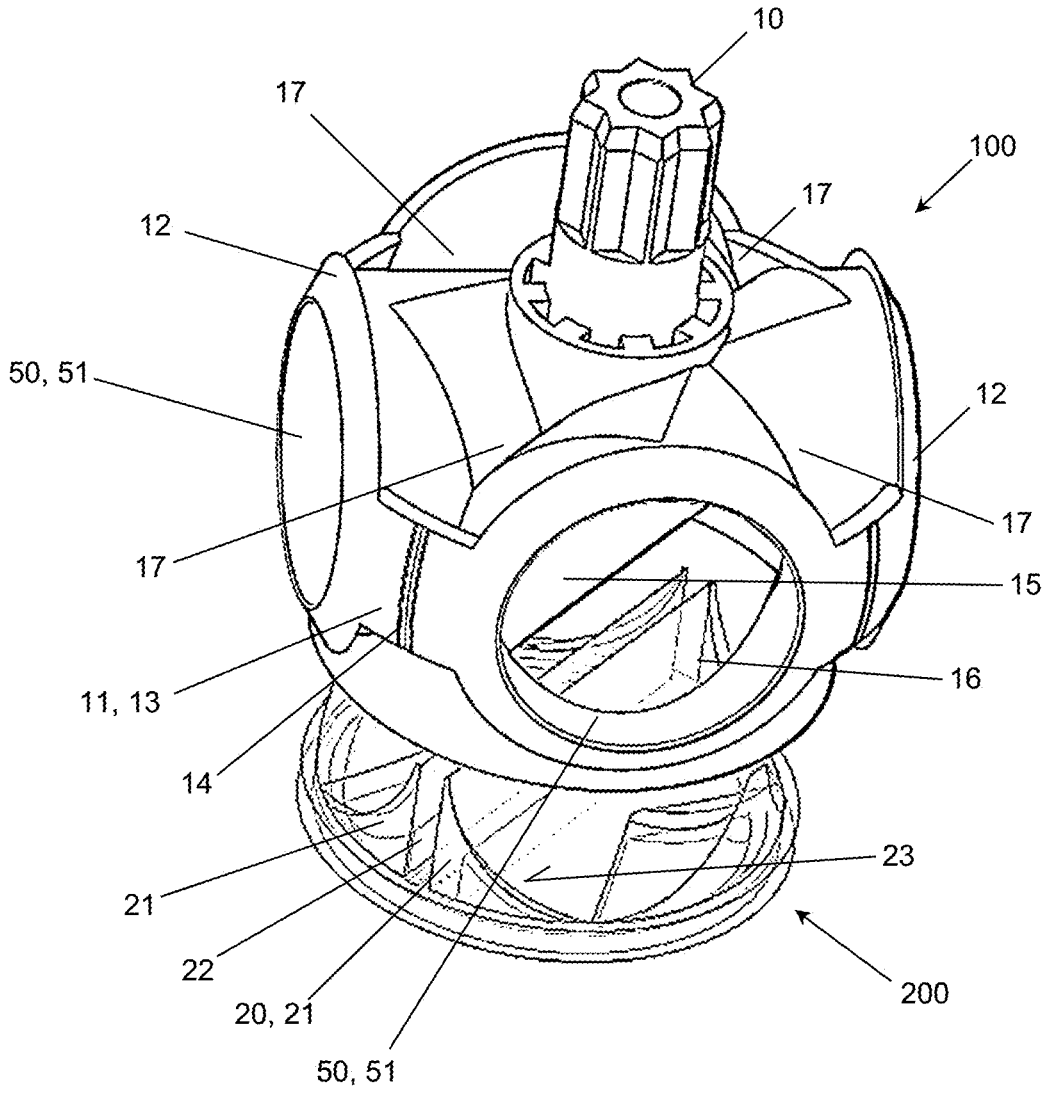
FIG. 1 shows a perspective exploded illustration of a valve body according to the invention with a base body and a separate cover according to a preferred exemplary embodiment.

FIG. 1 shows, in an exploded illustration, a valve body for a valve of a coolant system, wherein the valve body comprises a base body 100 and a cover 200. In the assembled state, the cover 200 closes an opening 16 of the base body 100. In this way, the valve body is completed.

In the illustrated exemplary embodiment, the base body 100 comprises a drive shaft 10 which is equipped with a toothing. The toothing serves for engagement in a drive which can be configured in particular as an electric motor. The electric motor is preferably a servomotor or a stepper motor.

The base body 100 comprises a contact surface 11 which is designed to abut a sealing arrangement of a valve housing of the valve. The contact surface 11 lies on a spherical enveloping surface. In other words, the contact surface 11 follows a spherical shape. However, the contact surface 11 thereby does not extend completely over the spherical enveloping surface, but rather merely in regions.

Specifically, the contact surface is formed by a plurality of sealing portions 12 and sliding portions 13. The sealing portions 12 thereby extend in a circular manner around access openings 51 of through channels 50 which extend through the valve body. The access openings 51 are preferably formed as circular openings completely in the base body 100. The sealing portion 12 of the contact surface 11 extends in an annular manner around the access openings 51.

Sliding portions 13 are each provided between the individual annular sealing portions 12. The sliding portions 13 extend along an equatorial plane of the base body 100. The sliding portions 13 substantially form a belt which extends concentrically around the drive shaft 10.

Within the scope of the present application, a plane which extends perpendicularly or orthogonally to the axis of rotation of the base body 100 is referred to as an equatorial plane. The axis of rotation of the base body 100 corresponds to the central axis of the drive shaft 10. The equatorial plane preferably runs in each case through the central points of the access openings 51. The equatorial plane substantially subdivides the valve body into a drive-proximal hemisphere and a drive-distal hemisphere. The drive shaft 10 is arranged on the drive-proximal hemisphere. By contrast, the drive-distal hemisphere comprises an opening 16 which extends parallel to the equatorial plane. The opening 16 is closed by the cover 200.

The sealing portions 12 and the sliding portions 13 are formed by the contact surface 11 and lie on the spherical enveloping surface. In other words, the sealing portions and the sliding portions arch along a spherical surface. The center of the spherical enveloping surface lies at the point of intersection between the equatorial plane and the axis of rotation.

It can be clearly seen in FIG. 1 that the sliding portions 13 have a height or a "belt width" which is smaller than the diameter of the access openings 51, in particular smaller than the diameter or inner diameter of the sealing portions 12. In regions between the adjacent sealing portions 12 which lie outside the sliding portions 13, the base body is recessed or does not fill the spherical enveloping surface. Rather, overflow regions 17 are provided there, over which coolant can flow during the switching of a valve. The overflow regions 17 form, so to speak, a bypass connection between two connection channels of a valve housing if the connection channels are not sealed against the sealing portions 12 and are thus connected to the through channels 50.

In the illustrated exemplary embodiment, the base body 100 is configured as an injection molded part. During the injection molding, separating ridges 14 are formed which extend through the sliding portions 13 in the valve body. In particular, the separating ridges 14 extend parallel to the axis of rotation through the sliding portions 13. The sealing portions 12 of the contact surface 11 are thus free of separating ridges 14. As a result, the sealing portions 12 are very smooth and therefore achieve a good and reliable seal against a sealing arrangement of a valve housing.

The separating ridge 14 is preferably arranged in a groove which extends parallel to the axis of rotation of the base body 100 through the sliding portion 13. The groove may substantially comprise a V-shaped cross section. The separating ridge 13 is countersunk over the entire circumference in the groove, i.e. it does not protrude beyond the contact surface 11.

Figure 2:
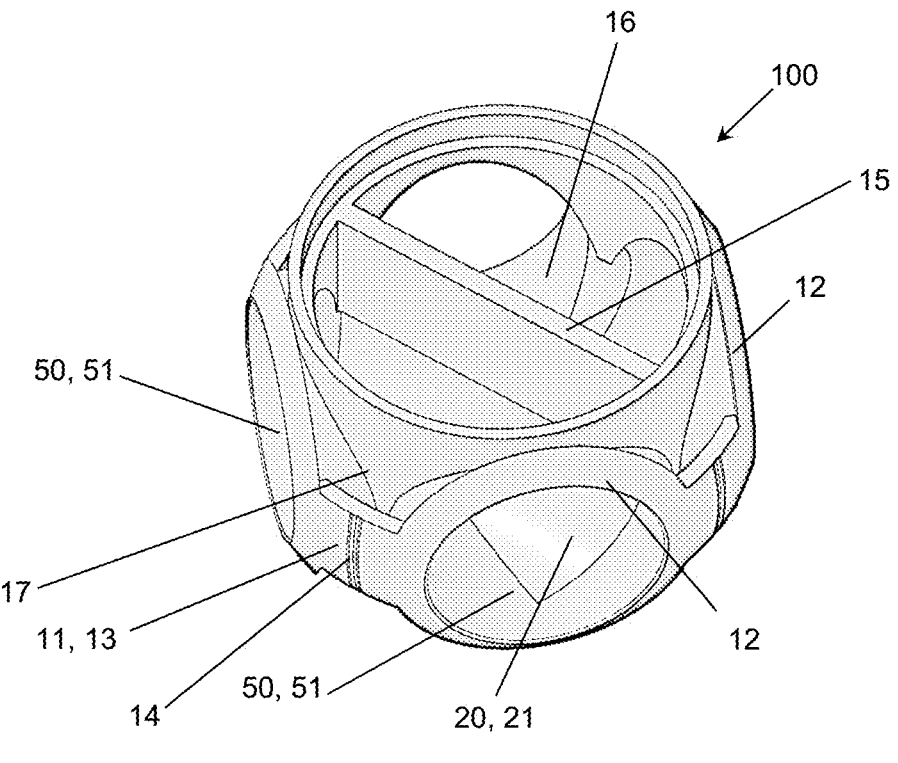
FIG. 2 shows a perspective bottom view of the base body according to FIG. 1.

In the exemplary embodiment illustrated in the drawings, the valve body has in each case two through channels 50. The through channels 50 each extend in one valve half, wherein the valve halves are separated from one another by a partition wall 15 which extends along the axis of rotation of the base body 100. This partition wall can be clearly seen in FIG. 2. In particular, it can be seen that the partition 15 extends to the opening 16, which is essentially formed at the bottom of the base body 100. FIG. 2 clearly shows that the through channels 50 in the base body 100 are not closed entirely. Rather, the through channels 50 are accessible through the opening 16. This accessibility makes it possible to manufacture the base body 100 with great geometric freedom in an injection-moulding process.

Figure 3:
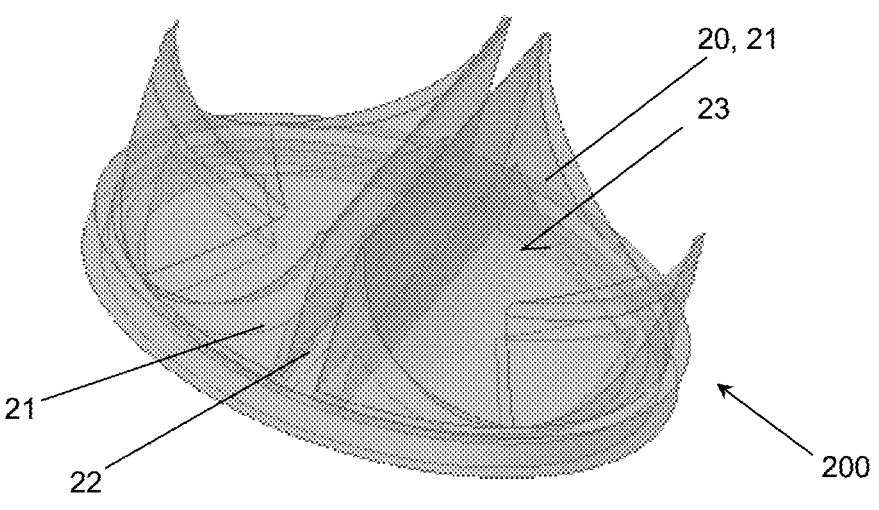
FIG. 3 shows a perspective illustration of the cover according to FIG. 1.

In particular, it is thus made possible to create the through channels 50 with a uniform cross-sectional diameter in an injection-moulding process. During manufacturing, four sliding elements are preferably introduced into the injection mold, wherein the sliding elements are inserted radially with respect to the axis of rotation of the base body 100 into the injection mold. The base body 100 is subsequently injection-molded. After the injection molding, the sliding elements are removed radially to the outside, so that the access openings 51 and the through channels 50 are shaped. The through channels 50 are opened or accessible through the opening 16, as can be clearly seen in FIG. 2. In order to close the through openings 50, so that the through openings 50 are tubular, the cover 200 is inserted, which can be seen in FIG. 3.

The cover 200 is likewise produced by an injection molding process. By doing so, a flow-guiding contour 20 is formed, which is configured substantially congruently to the flow-guiding contour 20 of the base body 100. In particular, it is provided that the flow-guiding contour 20 of the cover 200 has two legs 21, which substantially comprise a curved inner surface 23. The curved inner surface 23 preferably follows a circular cross-sectional contour.

A gap 22 is formed in the cover between the two legs 21. The gap 22 has a gap width, which substantially corresponds to the thickness or width of the partition wall 15. In this way, the cover 200 can be inserted into the opening 16 of the base body 100 in such a way that the gap 22 receives the partition wall 15 therein. In this case, the legs 21 preferably extend into the base body 100 to such an extent that the curved inner surface 23 of the leg 21 of the cover 200 merges flush into a curved inner surface of a flow-guiding contour 20 of the base body 100. In other words, the flow-guiding contour 20 of the cover 200 and the flow-guiding contour 20 of the base body 100 in the assembled state form at least one, in the present exemplary embodiment preferably two, tubular through channels 50.

In the assembled state of the valve body, the cover 200 is preferably arranged completely in the opening 16 of the base body 100. For the connection between the cover 200 and the base body 100, it is preferably provided that a welding method is used. In particular, the cover 200 can be connected to the base body 100 by hot-gas welding, ultrasonic welding or laser welding. In this case, the cover 200 is preferably sealed over the entire circumference against the base body 100.

The valve body is preferably inserted in a valve whose valve housing has a plurality of, in particular four, connection channels which are arranged such that the access openings 51 of the through channels 50 can be aligned flush with the connection channels. Thus, each two connection channels of the valve housing can be connected to one another via a through channel 50. The connection channels of the valve housing preferably each comprise a sealing arrangement which presses against the contact surface 11 and in particular seals completely against the sealing portions 12 of the contact surface 11. In a switching position in which coolant flows through the through channels 50, there is thus a high seal between the sealing arrangement of the valve housing and the sealing portions 12 of the contact surface 11.

For switching the valve, i.e. for deflecting the coolant flow into other connection channels, the valve body is rotated. In particular, the drive which acts on the drive shaft 10 is activated. As a result, the valve body is rotated about its axis of rotation. In this way, the access openings 51 move into a position in which they are no longer flush with the connection channels. The contact surface 11 of the valve body slides over the sealing arrangement in the valve housing during the switching operation. In particular, the sliding portions 13 of the contact surface 11 rub over the sealing arrangement. Since the contact surface 11 is very smooth, in particular due to the separating ridges 14 countersunk in the grooves, and lies on a spherical enveloping surface, a very uniform and jerk-free movement takes place, which can be carried out with little expenditure of energy.

If a connection opening of the valve housing now moves into the region of a sliding portion 13 of the contact surface 11, a fluid flow from the connection channel into the overflow region 17 is also possible. The connection channel preferably has a diameter which corresponds to the diameter of the access opening 51 or of the through channel 50. Since the sliding portions 13 have a smaller height than the diameter of the access opening 51, a flow channel results from the connection channels into the overflow region 17.

The coolant which flows through the coolant system is therefore not completely stopped by the valve body even during the switching operation, but rather can be conducted at least partially over the base body 100 or the valve body into other connection channels. In this way, pressure peaks that arise due to brief complete blocking of the coolant flow are avoided.

As soon as an adjacent access opening 51 of a through channel 50 overlaps with the connection channel of the valve housing, the sealing arrangement of the valve housing seals completely against the sealing portion 12 of the contact surface. The coolant flow is then no longer conducted over the valve body, but rather exclusively through the through channel 50.

REFERENCE SIGNS

10 drive shaft
11 contact surface
12 sealing portion
13 sliding portion
14 separating ridge
15 partition wall
16 opening
17 overflow region
20 flow-guiding contour
21 leg
22 gap
23 inner surface
50 through channel
51 access opening
100 base body
200 cover

The invention claimed is:

1. A valve body for a valve of a coolant system, comprising:
   at least one tubular through channel for a coolant; and
   a base body configured to be rotatable about an axis of rotation by a drive and having a contact surface for abutting against a sealing arrangement of a valve housing of the valve with at least two sealing portions and at least two sliding portions which lie on a spherical enveloping surface,
   wherein the base body is divided by an equatorial plane arranged orthogonally to the axis of rotation,
   wherein the base body comprises an opening arranged parallel to the equatorial plane, and
   wherein the opening is closed by a cover such that the at least one tubular through channel is formed tubular by the base body and the cover.

2. The valve body according to claim 1, wherein the at least one tubular through channel has a uniform cross-sectional diameter.

3. The valve body according to claim 1, wherein the cover is connected to the base body in an integrally bonded and/or form-fitting manner.

4. The valve body according to claim 3, wherein the cover is connected to the base body in the integrally bonded and/or form-fitting manner by welding or clipping.

5. The valve body according to claim 1, wherein the base body has a partition wall extending along an axis of rotation of a drive shaft and dividing the base body into two valve halves, wherein a through channel is formed in each valve half.

6. The valve body according to claim 5, wherein the cover has a flow-guiding contour with two parallel legs, between which a gap for receiving the partition wall extends.

7. The valve body according to claim 6, wherein the flow-guiding contour of the cover has a curved inner surface which merges flush into a curved inner surface of a flow-guiding contour of the base body and delimits the at least one tubular through channel.

8. The valve body according to claim 1, wherein the at least two sliding portions of the contact surface are each subdivided by a separating ridge extending parallel to the axis of rotation.

9. The valve body according to claim 8, wherein the separating ridge is arranged so as to be completely countersunk in a groove.

10. The valve body according to claim 1, wherein each one of the at least two sealing portions extends in a circular manner around a respective access opening of one of the at least one tubular through channel.

11. A method for manufacturing the valve body according to claim 1, wherein the base body and the cover are each shaped by an injection-moulding process and are subsequently connected to one another.

12. The method according to claim 11, wherein the cover is connected to the base body by welding or by clipping.

13. The method according to claim 12, wherein the cover is connected to the base body by hot gas welding, ultrasonic welding or laser welding.

14. A valve body for a valve of a coolant system, comprising:
   at least one tubular through channel for a coolant; and
   a base body configured to be rotatable about an axis of rotation by a drive and having a contact surface for abutting against a sealing arrangement of a valve housing of the valve with at least two sealing portions and at least two sliding portions which lie on a spherical enveloping surface,
   wherein the base body is divided by an equatorial plane arranged orthogonally to the axis of rotation,
   wherein the base body comprises an opening arranged parallel to the equatorial plane and closed by a cover, wherein the at least one tubular through channel is formed by the base body and the cover, and
   wherein the at least two sliding portions have a height which is smaller than a diameter of the sealing portions, such that the coolant can flow over the base body during a switching operation of the valve.

\* \* \* \* \*